(12) United States Patent
Hsiao et al.

(10) Patent No.: US 10,663,848 B2
(45) Date of Patent: May 26, 2020

(54) PROJECTOR AND LIGHT DEVICE THEREOF

(71) Applicant: QISDA CORPORATION, Taoyuan (TW)

(72) Inventors: Chi-Hung Hsiao, Taoyuan (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/205,142

(22) Filed: Nov. 29, 2018

(65) Prior Publication Data
US 2019/0179223 A1 Jun. 13, 2019

(30) Foreign Application Priority Data

Dec. 13, 2017 (CN) .......................... 2017 1 1332803

(51) Int. Cl.
| | | |
|---|---|---|
| *G02B 26/00* | (2006.01) | |
| *G03B 21/00* | (2006.01) | |
| *G03B 21/20* | (2006.01) | |
| *G03B 21/16* | (2006.01) | |

(52) U.S. Cl.
CPC ..... *G03B 21/2046* (2013.01); *G03B 21/2013* (2013.01); *G02B 26/008* (2013.01); *G03B 21/008* (2013.01); *G03B 21/16* (2013.01)

(58) Field of Classification Search
CPC ............ G03B 21/2046; G03B 21/2013; G03B 21/008; G03B 21/16; G02B 26/008
USPC .......................................................... 353/57
See application file for complete search history.

(56) References Cited

U.S. PATENT DOCUMENTS

| | | | | |
|---|---|---|---|---|
| 3,914,645 A | * | 10/1975 | Li Donnici | ........ G03B 21/2053 315/89 |
| 2007/0216879 A1 | * | 9/2007 | Yoshikawa | .......... G03B 21/008 353/99 |
| 2011/0176115 A1 | * | 7/2011 | Inoue | ..................... G03B 21/28 353/31 |

FOREIGN PATENT DOCUMENTS

JP 02000155375 A * 11/1998 ............. G03B 21/14

OTHER PUBLICATIONS

Machine Translation of JP02000155375A (Year: 2019).*

* cited by examiner

*Primary Examiner* — Jerry L Brooks

(57) ABSTRACT

A projector includes a projection lens, an optical engine, and a light device. The light device has a lighting axis and includes a movable frame, two light sources fixedly disposed on the movable frame, and a driving part kinematically connected with the movable frame. The driving part is disposed in front of the two light sources. The driving part moves the movable frame such that the two light sources moves simultaneously so as to selectively make one of the two light sources emit light along the lighting axis, which avoids single light source operating for long time. The optical engine is disposed close to the light device and has a light entrance axis. The light entrance axis coincides with the lighting axis. The optical engine includes a digital micromirror device that modulates light from the light device to be projected out the projector through the projection lens.

16 Claims, 7 Drawing Sheets

PROJECTOR AND LIGHT DEVICE THEREOF

BACKGROUND OF THE INVENTION

1. Field of the Invention

The present invention relates to a projector and a light device thereof, and more particularly to a light device with backup light source and a projector having the light device.

2. Description of the Prior Art

A light device of a common projector usually has a single light bulb and provides required light by this light bulb. For the assurance of the required brightness of projected images, the light bulb often operates at high power levels. The light bulb will produce much heat continuously under such operation condition. The projector is commonly provided with a heat dissipation system, however, which simply prevents the light bulb from burning down due to an excessively high operation temperature. The light bulb still operates at high temperature. Thus, the working life of the light bulb is limited in a certain degree. If the light bulb operates for long time, the working life of the light bulb will be decreased further, which increases the replacement frequency of the light bulb for the projector and also increases the cost of consumables for the projector.

SUMMARY OF THE INVENTION

The present invention provides a projector and a light device thereof. The light device includes two light sources and can selectively switch the two light sources by a mechanism to provide required light for the projector, so as to avoid single light source operating for long time.

A light device according to the present invention includes a movable frame, a first light source, a second light source, and a driving part. The first light source is fixed on the movable frame. The first light source is capable of emitting light in a first lighting direction. The second light source is fixed on the movable frame. The second light source is capable of emitting light in a second lighting direction. The driving part and the movable frame are kinematically connected with each other. The driving part is in front of the first light source and the second light source in the first lighting direction and the second lighting direction respectively. Therein, the driving part moves the movable frame such that the first light source and the second light source move simultaneously so as to selectively make the first light source or the second light source emit light along the lighting axis.

A projector according to the invention includes a projection lens, an optical engine, and the above-mentioned light device. The optical engine is disposed close to the light device and has a light entrance axis. The light entrance axis coincides with the lighting axis. The optical engine includes a digital micromirror device. The digital micromirror device modulates the light from the light device to be projected out the projector through the projection lens.

Compared with the prior art, the projector and the light device thereof according to the invention can switch to one from the other of the first light source and the second light source by the driving part, which can avoid single light source (the first light source or the second light source) operating for long time and thereby avoid decreasing the working life of the first light source and the second light source as a whole. In other words, compared with the prior art, a sum of the working life of the first light source and the working life of the second light source is twice larger than the working life of the light bulb of the common projector in the prior art.

These and other objectives of the present invention will no doubt become obvious to those of ordinary skill in the art after reading the following detailed description of the preferred embodiment that is illustrated in the various figures and drawings.

DETAILED DESCRIPTION

For further understanding of the objective, structures, features, and functions of the invention, the following describes the invention in more details by embodiments.

In the specification and the claims, some terms are used to refer to specific components. A person having ordinary skill in the art should be able to understand that manufacturers may use different terms for referring to the same components. In the specification and the claims, the components are distinguished based on the functional difference therebetween, not based on the difference between the terms. The term "include" used in the specification and the claims is an open-ended term and should be interpreted as "include but not limited to".

The terms, such as first, second, . . . and so on in the specification and the claims, are not used for referring to an order or sequence specially and also not for restricting the invention. They are used merely for distinguishing components or steps which are described in the same (or equal) technical language.

Figure 1:
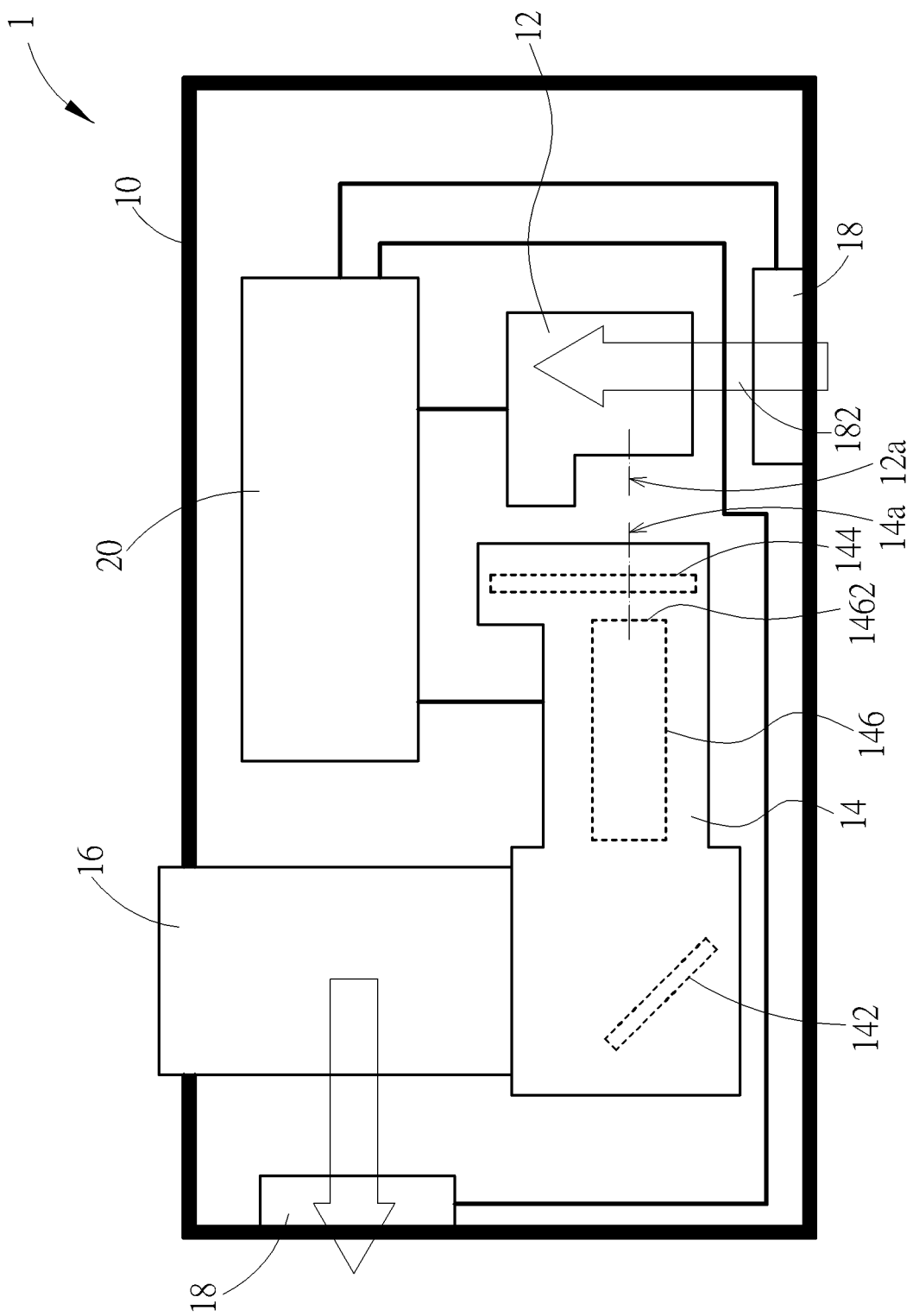
FIG. 1 is a schematic diagram illustrating the configuration of a projector according to an embodiment.

Referring to FIG. 1. A projector 1 of an embodiment according to the invention includes a casing 10 (shown by a rectangle in bold line in FIG. 1) and a light device 12, an optical engine 14, a projection lens 16, a plurality of fans 18, and a controlling module 20 which are disposed in the casing 10. Therein, the projection lens 16 is exposed out of the casing 10 so as to be able to project light outward; all components are shown by rectangles in FIG. 1. The controlling module 20 is electrically connected with (indicated by thick lines) the light device 12, the optical engine 14, and the fans 18 for power supply and operation control. In practice, the controlling module 20 can be achieved by one or more interconnected circuit board modules (for example, but not limited to, a circuit board, which is provided with required electronic components thereon). The controlling module 20 is connected to an external power source by a cable and then receives power therefrom. The optical engine 14 is disposed close to the light device 12. The fans 18 are used for producing air flow (presented by hollow arrows in FIG. 1) for dissipating heat produced by the components inside the casing 10. The light device 12 has a lighting axis 12a (indicated by a chain line in FIG. 1). The optical engine 14 has a light entrance axis 14a (indicated by a chain line in FIG. 1). The lighting axis 12a and the light entrance axis 14a coincide. The optical engine 14 includes a digital micromirror device 142. The digital micromirror device 142 modulates light from the light device 12 to be projected out the projector 1 through the projection lens 16. The light device 12 includes a first light source 122 and a second light source 124 and can selectively switch to one from the other of the first light source 122 and the second light source 124 by an switching mechanism (described in the following) to provide light for the optical engine 14, so as to avoid single light source operating for long time.

Figure 2:
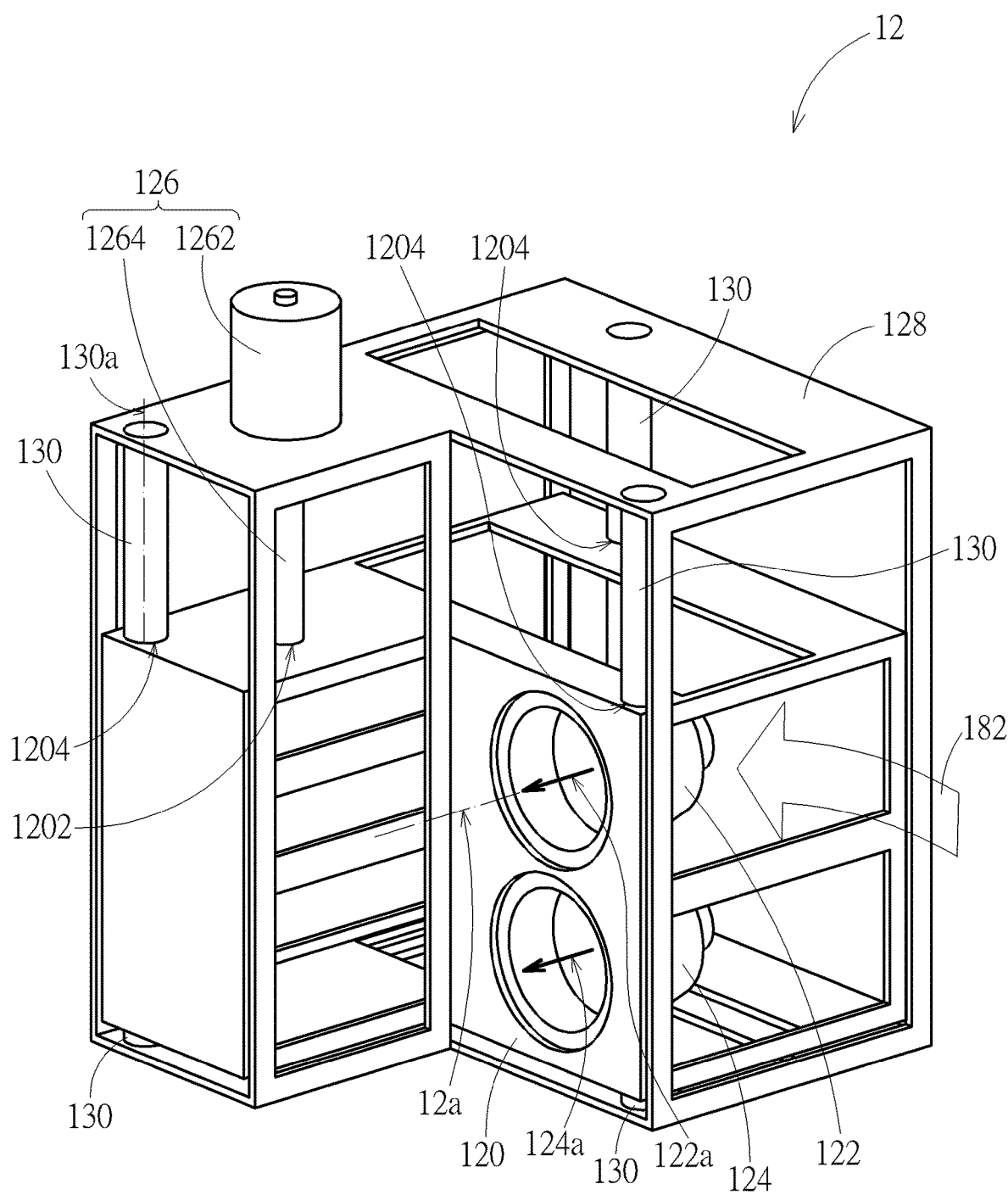
FIG. 2 is a schematic diagram illustrating a light device of the projector in FIG. 1.

Please also refer to FIG. 2. Further, in the embodiment, the light device 12 includes a movable frame 120 and a driving part 126. The driving part 126 is kinematically connected with the movable frame 120. The first light source 122 is fixed on the movable frame 120. The first light source 122 thereon defines a first lighting direction 122a (indicated by an arrow in FIG. 2). The first light source 122 can emit light in the first lighting direction 122a. The second light source 124 is fixed on the movable frame 120. The second light source 124 thereon defines a second lighting direction 124a (indicated by an arrow in FIG. 2). The second light source 124 can emit light in the second lighting direction 124a. In practice, the first light source 122 and the second light source 124 can be, but not limited to, a metal halide lamp. Both the first light source 122 and the second light source 124 include a lampshade and a light-emitting unit inside the lampshade. The lampshade has a symmetry axis, equivalent to a lighting axis thereof. The opening of the lampshade is equivalent to a lighting direction thereof. In the embodiment, the first light source 122 is fixed on the movable frame 120 through, but not limited to, a front fringe of the lampshade. For example, if the first light source 122 is provided with a fixing frame, the first light source 122 can be fixed on the movable frame 120 through the fixing frame; so does the second light source 124. Furthermore, in the embodiment, the first lighting direction 122a and the second lighting direction 124a are equal in direction and parallel to the lighting axis 12a. Furthermore, the driving part 126 is disposed in front of the first light source 122 and the second light source 124 in the first lighting direction 122a and the second lighting direction 124a respectively. The driving part 126 can move the movable frame 120 such that the first light source 122 and the second light source 124 move simultaneously so as to selectively make the first light source 122 or the second light source 124 emit light along the lighting axis 12a; thereby, the first light source 122 and the second light source 124 are selectively switched to and from each other to provide light for the optical engine 14, which can avoid single light source operating for long time. In the embodiment, the driving part 126 includes a motor 1262 (for example, but not limited to, a servomotor) and a screw rod 1264 (shown by a rod in FIG. 2) kinematically connected with the motor 1262. The movable frame 120 has a threaded hole 1202. The screw rod 1264 engages with the threaded hole 1202, so that the motor 1262 can rotate the screw rod 1264 to make the movable frame 120 move relative to the motor 1262.

Furthermore, the light device 12 includes a supporting frame 128 and at least one guiding post 130 fixed on the supporting frame 128. The supporting frame 128, but not limited to, also functions as the device frame of the light device 12. The movable frame 120 is slidably connected to the at least one guiding post 130, so that the movable frame 120 can slide along the guiding post 130. In the embodiment, the light device 12 is provided with three guiding posts 130. The three guiding posts 130 pass through the corresponding through holes 1204 on the movable frame 120. In the embodiment, the cross-sections of the guiding post 130 and the through hole 1204 are circles, but not limited thereto. For example, in a case where only one guiding post is used and has a non-circular cross-section (such as, but not limited to, a rectangular cross-section, a polygonal cross-section, a star-shaped cross-section, a teeth-shaped cross-section and so on) and the corresponding through hole on the movable frame 120 has a cross-section matching the non-circular cross-section, the engagement thereof also can guide the movable frame 120 to slide effectively and keep the disposition orientation of the movable frame 120 unchanged. Furthermore, in the embodiment, the motor 1262 of the driving part 126 is fixed on the supporting frame 128, so the motor 1262 can rotate the screw rod 1264 to make the movable frame 120 slide along the at least one guiding post 130, so as to perform the operation of selectively switching to one from the other of the first light source 122 and the second light source 124. Therein, the first light source 122 and the second light source 124 are arranged along, but not limited to, the movement path of the movable frame 120.

Figure 3:
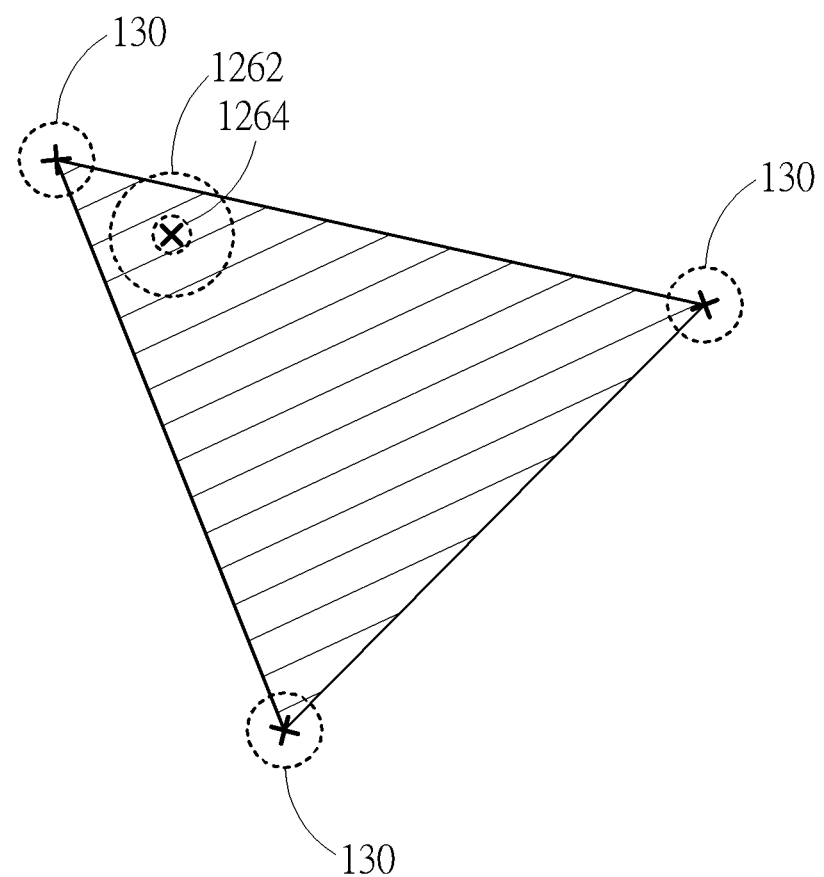
FIG. 3 is a schematic diagram illustrating the relationship of the projections of guiding posts and a screw rod of the light device in FIG. 2 along an extending axis.

Furthermore, in the embodiment, the at least one guiding post 130 extends along an extending axis 130a (indicated by a chain line in FIG. 2). The extending axis 130a is perpendicular to the lighting axis 12a, but not limited thereto in practice. For example, the guiding post 130 obliquely extends (i.e. the extending axis 130a and the lighting axis 12a forming an included angle except for right angles), so as to make the movable frame 120 also slide obliquely, which still can perform the operation of selectively switching to one from the other of the first light source 122 and the second light source 124. Furthermore, in practice, the screw rod 1264 can be directly connected to the rotor of the motor 1262 or be kinematically connected to the rotor of the motor 1262 through a reduction gear set. The screw rod 1264 also extends along the extending axis 130a. When the at least one guiding post 130 is larger than two in number, a projection center of the screw rod 1264 projected along the extending axis 130a onto a plane is located within an area formed by connecting projection centers of the guiding posts 130 projected along the extending axis 130a onto the plane. As shown by FIG. 3 (therein, the triangular area is hatched, the projection centers of the screw rod 1264 and the guiding posts 130 are indicated by cross marks, the viewpoint of FIG. 3 is equivalent to the top view of the light device 12 in FIG. 2, and the projection profiles of the motor 1262, the screw rod 1264 and guiding posts 130 are shown by dashed lines in FIG. 3), the projection center of the screw rod 1264 projected along the extending axis 130a onto the plane is located within the area formed by connecting the three projection centers of the three guiding posts 130 projected along the extending axis 130a onto the plane; therein, the plane is perpendicular to the extending axis 130a. In principle, the movement of the movable frame 120 is limited by the guiding post 130 and the screw rod 1264. The movable frame 120 is driven to move by the screw rod 1264. In the embodiment, the projection center of the screw rod 1264 is located within the triangular area, so the movable frame 120 can steadily slide on the guiding posts 130.

Figure 4:
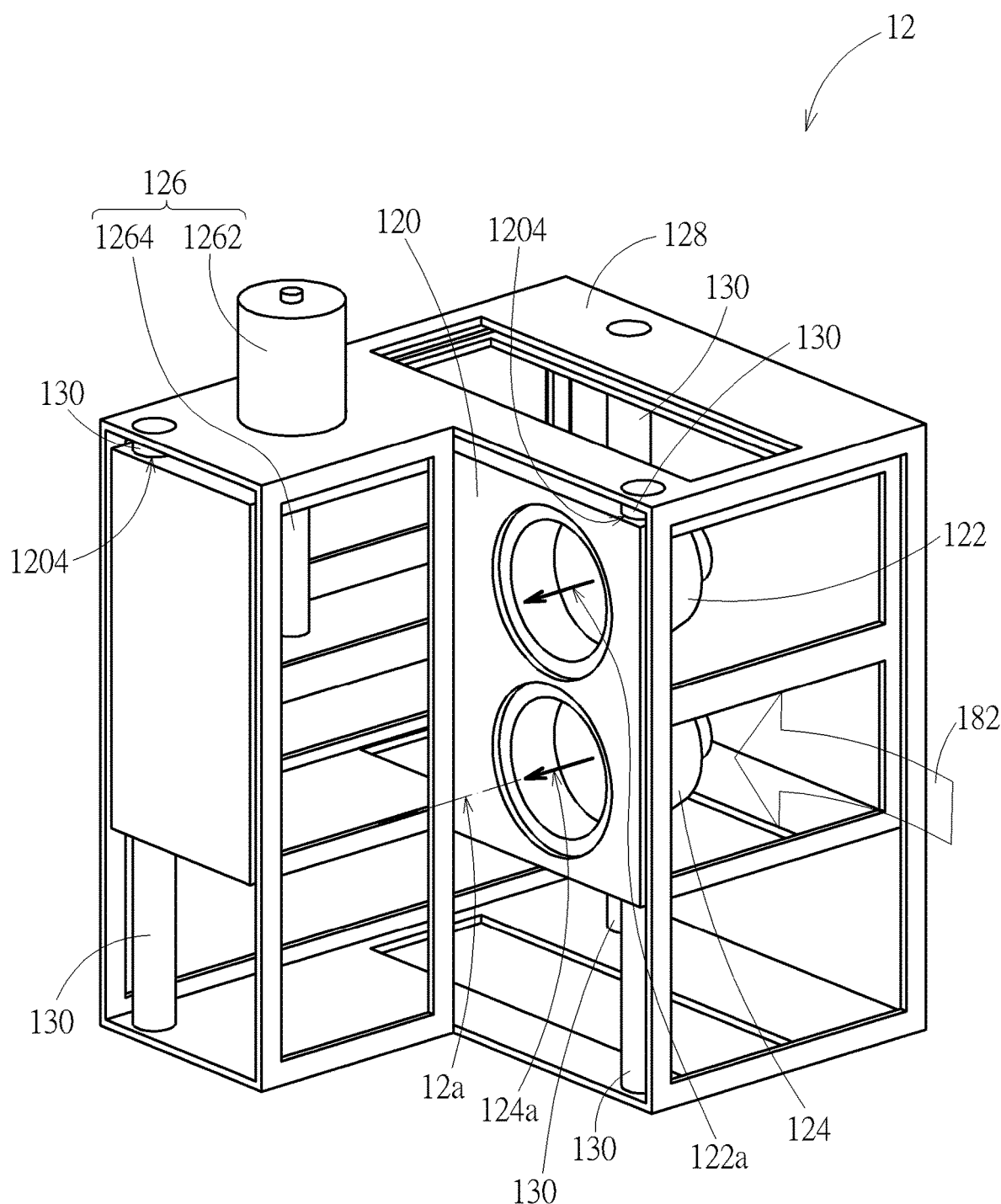
FIG. 4 is a schematic diagram illustrating the light device of the projector in FIG. 1 at another state.

As shown by FIG. 2, the first lighting direction 122a of the first light source 122 coincides with the lighting axis 12a, so in this case the light device 12 provides light for optical engine 14 through the first light source 122. When the driving part 126 drives the movable frame 120 to move for switching to the second light source 124 from the first light source 122, such that the second lighting direction 124*a* of the second light source 124 coincides with the lighting axis 12*a*, the light device 12 provides light for optical engine 14 through the second light source 124, as shown by FIG. 4.

Furthermore, as shown by FIG. 1, in the embodiment, the optical engine 14 includes a color wheel 144 and an integral rod 146. The integral rod 146 extends along the light entrance axis 14*a* and has a light entrance end 1462. The color wheel 144 is disposed between the light entrance end 1462 and the light device 12. Furthermore, one of the fans 18 produces an air flow 182 (presented by a hollow arrow in FIG. 1 and FIG. 2) for dissipating heat produced by the light device 12. As shown by FIG. 2, the air flow 182 passes by rear sides of the first light source 122 and the second light source 124 (i.e. the sides of the first light source 122 and the second light source 121 opposite to the sides at which the first light source 122 and the second light source 121 emit light out), so as to dissipate heat produced by the first light source 122 and the second light source 124. In the embodiment, the driving part 126 is disposed in front of the first light source 122 and the second light source 124, and thus will not interfere with the heat dissipation of the air flow 182 to the first light source 122 and the second light source 124 in principle.

Figure 5:
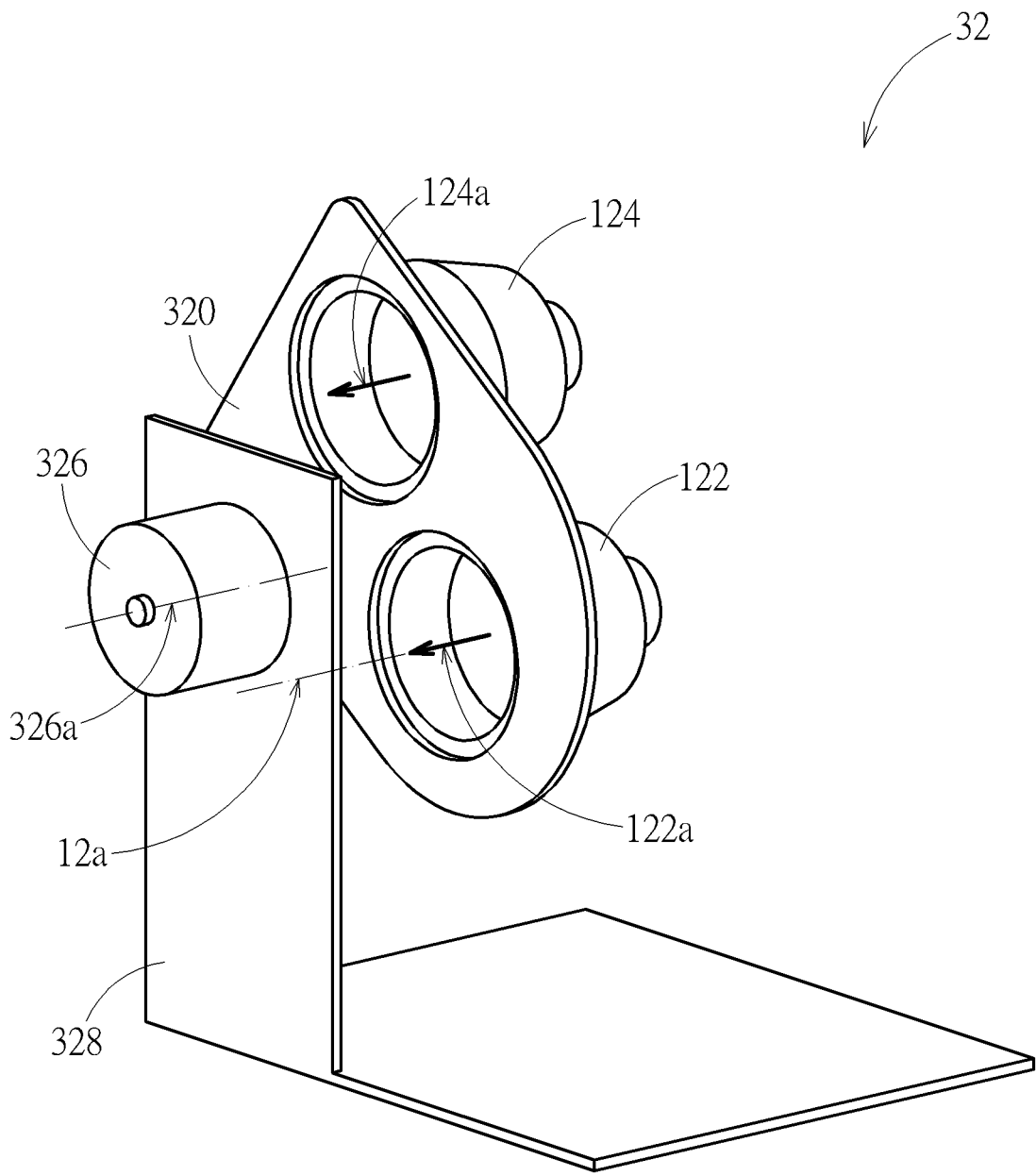
FIG. 5 is a schematic diagram illustrating a light device according to another embodiment.
Figure 6:
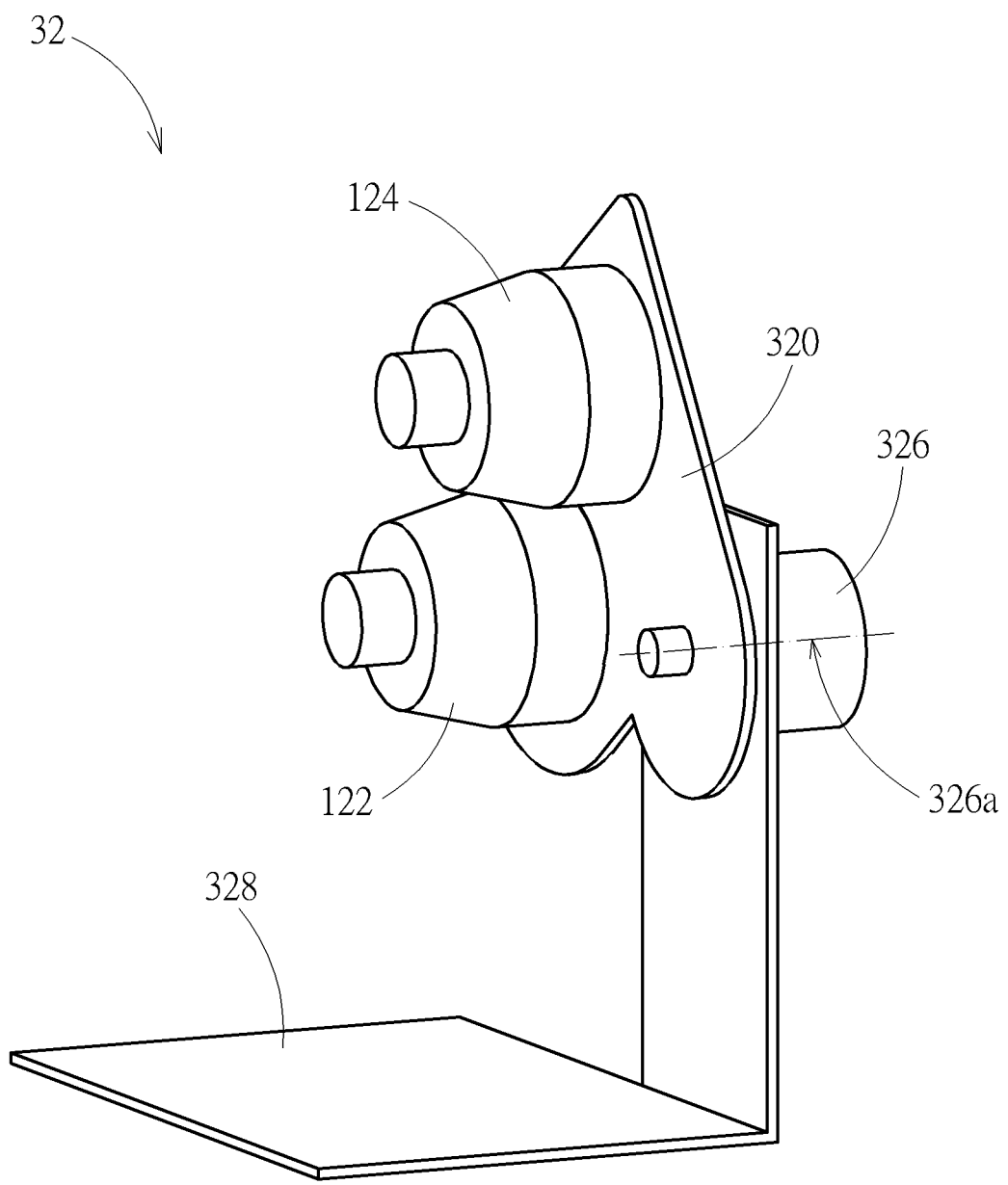
FIG. 6 is a schematic diagram illustrating the light device in FIG. 5 at another view point.

The above embodiment is based on that the switching of the first light source 122 and the second light source 124 is performed by shifting the first light source 122 and the second light source 124; however, the switching of the first light source 122 and the second light source 124 is not limited thereto in practice. As shown by FIG. 5 and FIG. 6, a light device 32 according to another embodiment switches to one from the other of the first light source 122 and the second light source 124 by rotating the first light source 122 and the second light source 124, and thus, can be used in the projector 1 instead of the light device 12. The light device 32 and the light device 12 are different mainly in their switching mechanisms; thus, for other descriptions about the light device 32, please refer to the relevant descriptions of the light device 12 in the foregoing, which will not be described in addition. In the embodiment, the light device 32 includes a movable frame 320 and a driving part 326 kinematically connected with the movable frame 320. The first light source 122 and the second light source 124 are fixed on the movable frame 320. The driving part 326 is located in front of the first light source 122 and the second light source 124 in the first lighting direction 122*a* of the second lighting direction 124*a* respectively. The driving part 326 includes a motor (for example, but not limited to, a servomotor). The movable frame 320 is fixedly connected to the rotor of the motor (or the movable frame 320 is kinematically connected to the rotor of the motor through a reduction gear set); thereby, the driving part 326 can rotate the movable frame 320 so that the first light source 122 and the second light source 124 rotate simultaneously so as to selectively make the first light source 122 or the second light source 124 emit light along the lighting axis 12*a*. Therein, the first light source 122 and the second light source 124 are arranged along the rotation path of the movable frame 320. Furthermore, the motor of the driving part 326 (or the driving part 326) has a rotation axis 326*a*. The rotation axis 326*a* is parallel to the lighting axis 12*a*. The motor of the driving part 326 drives the movable frame 320 to rotate around the rotation axis 326*a*. Furthermore, the light device 32 includes a supporting frame 328. The motor of the driving part 326 is fixed on the supporting frame 328 and can drive the movable frame 320 to rotate relative to the supporting frame 328; therein, in practice, the supporting frame 328, but not limited to, also functions as the device frame of the light device 32.

Figure 7:
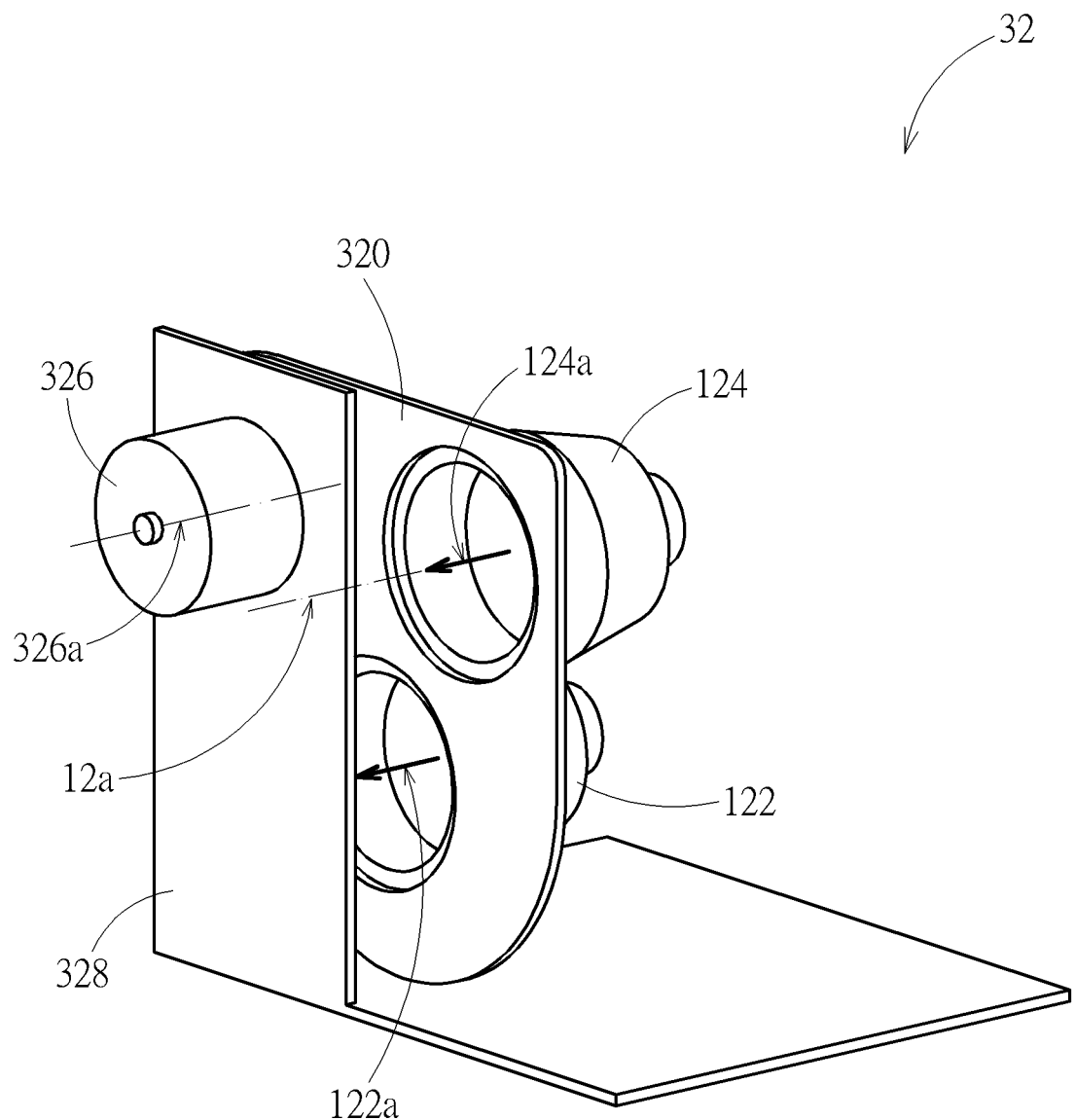
FIG. 7 is a schematic diagram illustrating the light device in FIG. 5 at another state.

As shown by FIG. 5, the first lighting direction 122*a* of the first light source 122 coincides with the lighting axis 12*a*, so in this case the light device 32 provides light for optical engine 14 through the first light source 122. When the driving part 326 drives the movable frame 320 to rotate for switching to the second light source 124 from the first light source 122, such that the second lighting direction 124*a* of the second light source 124 coincides with the lighting axis 12*a*, the light device 32 provides light for optical engine 14 through the second light source 124, as shown by FIG. 7.

In the above embodiments, the light device 12 and the light device 32 switch light sources by a moving mechanism and a rotating mechanism respectively, so as to avoid single light source operating for long time. In practice, the light device 12 and the light device 32 still can be in operation with a modification to the above-mentioned switching mechanisms or with a replacement of a switching mechanism that can change the positions of the first light source 122 and the second light source 124 (or the position of the movable frame). For example, for the light device 12, the orientation of the motor 1262 can be changed such that the rotation axis of the motor 1262 is perpendicular to both the lighting axis 12*a* and the extending axis 130*a*. A rack is disposed on the movable frame 120. A pinion is disposed on the rotor of the motor 1262 and meshes with the rack. The configuration of this case also can make the movable frame 120 move along the guiding post 130. For another example, for the light device 12, the driving part 126 can be replaced with an electromagnetic actuator. The electromagnetic actuator can move a metal rod by an electromagnetic effect. The movable frame 120 is fixedly connected to the metal rod. The configuration of this case also can make the movable frame 120 move along the guiding post 130. In addition, in the above embodiments, the first light source 122 and the second light source 124 are disposed on the same plane. The first lighting direction 122*a* and the second lighting direction 124*a* are parallel. However, the invention is not limited thereto. For example, the movable frame can be achieved by a curved plate. The first light source 122 and the second light source 124 are fixed on the curved plate, such that the first lighting direction 122*a* and the second lighting direction 124*a* are not parallel. By a pinion (e.g. driven by a motor) meshing with a rack (fixed on the curved plate), the curved plate can be rotate so as to selectively make the first light source 122 or the second light source 124 emit light along the lighting axis 12*a*. In addition, in the above embodiments, the driving parts 126 and 326 are electrically powered; however, the invention is not limited thereto. For example, the driving part can be achieved by a rod that is fixedly connected to the movable frame 120 and protrudes out the casing 10, so that a user can move the rod so as to move the movable frame, which also can perform the operation of selectively switching to one from the other of the first light source 122 and the second light source 124. Further, the rod can be replaced with a mechanical linkage.

As described above, the projector and the light device thereof according to the invention can switch to one from the other of the first light source and the second light source by the driving part, which can avoid single light source (the first light source or the second light source) operating for long time and thereby avoid decreasing the working life of the first light source and the second light source as a whole. In other words, compared with the prior art, a sum of the working life of the first light source and the working life of the second light source is twice larger than the working life of the light bulb of the common projector in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light device for a projector, the light device having a lighting axis and comprising:
    a supporting frame;
    at least one guiding post, fixed on the supporting frame, each guiding post extending along an extending axis;
    a movable frame, slidably connected to the at least one guiding post along the extending axis;
    a first light source, fixed on the movable frame, the first light source being capable of emitting light in a first lighting direction;
    a second light source, fixed on the movable frame, the second light source being capable of emitting light in a second lighting direction; and
    a driving part, kinematically connected with the movable frame, the driving part being in front of the first light source and the second light source in the first lighting direction and the second lighting direction respectively, wherein the driving part moves the movable frame along the extending axis such that the first light source and the second light source move simultaneously so as to selectively make the first light source or the second light source emit light along the lighting axis.

2. The light device according to claim 1, wherein the first lighting direction and the second lighting direction are equal and are parallel to the lighting axis.

3. The light device according to claim 1, wherein the movable frame has at least one through hole, the at least one guiding post passes through the at least one through hole respectively, the guiding post has a non-circular cross-section, the through hole has a cross-section matching the non-circular cross-section.

4. The light device according to claim 1, wherein the driving part comprises a motor and a screw rod kinematically connected with the motor, the movable frame has a threaded hole, the motor is fixed on the supporting frame, the screw rod engages with the threaded hole, and the motor drives the screw rod to rotate to make the movable frame slide along the at least one guiding post.

5. The light device according to claim 4, wherein the at least one guiding post is three in number, a projection center of the screw rod projected along the extending axis onto a plane is located within a triangular area formed by connecting three projection centers of the three guiding posts projected along the extending axis onto the plane, and the plane is perpendicular to the extending axis.

6. The light device according to claim 5, wherein the extending axis is perpendicular to the lighting axis.

7. A projector, comprising:
    a light device, having a lighting axis and comprising:
        a supporting frame;
        at least one guiding, post fixed on the supporting frame, each guiding post extending along an extending axis;
        a movable frame, slidably connected to the at least one guiding post along the extending axis;
        a first light source, fixed on the movable frame, the first light source being capable of emitting light in a first lighting direction;
        a second light source, fixed on the movable frame, the second light source being capable of emitting light in a second lighting direction; and
        a driving part, kinematically connected with the movable frame, the driving part being in front of the first light source and the second light source in the first lighting direction and the second lighting direction respectively, wherein the driving part moves the movable frame along the extending axis such that the first light source and the second light source move simultaneously so as to selectively make the first light source or the second light source emit light along the lighting axis;
    a projection lens; and
    an optical engine, disposed close to the light device, the optical engine having a light entrance axis, the light entrance axis coinciding with the lighting axis, the optical engine comprising a digital micromirror device, the digital micromirror device modulating the light from the light device to be projected out the projector through the projection lens.

8. The projector according to claim 7, wherein the first lighting direction and the second lighting direction are equal and are parallel to the lighting axis.

9. The projector according to claim 7, wherein the movable frame has at least one through hole, the at least one guiding post passes through the at least one through hole respectively, the guiding post has a non-circular cross-section, the through hole has a cross-section matching the non-circular cross-section.

10. The projector according to claim 7, wherein the driving part comprises a motor and a screw rod kinematically connected with the motor, the movable frame has a threaded hole, the motor is fixed on the supporting frame, the screw rod engages with the threaded hole, and the motor drives the screw rod to rotate to make the movable frame slide along the at least one guiding post.

11. The projector according to claim 10, wherein the at least one guiding post is three in number, a projection center of the screw rod projected along the extending axis onto a plane is located within a triangular area formed by connecting three projection centers of the three guiding posts projected along the extending axis onto the plane, and the plane is perpendicular to the extending axis.

12. The projector according to claim 11, wherein the extending axis is perpendicular to the lighting axis.

13. The projector according to claim 7, wherein the optical engine comprises a color wheel and an integral rod, the integral rod extends along the light entrance axis and has a light entrance end, and the color wheel is disposed between the light entrance end and the light device.

14. The projector according to claim 7, further comprising a fan, wherein the fan generates an air flow, and the air flow passes by rear sides of the first light source and the second light source.

15. A light device for a projector, the light device having a lighting axis and comprising:
    a supporting frame;
    at least one guiding post, fixed on the supporting frame;
    a movable frame, slidably connected to the at least one guiding post, the movable frame having a threaded hole;

a first light source, fixed on the movable frame, the first light source being capable of emitting light in a first lighting direction;

a second light source, fixed on the movable frame, the second light source being capable of emitting light in a second lighting direction; and a driving part, kinematically connected with the movable frame, the driving part being in front of the first light source and the second light source in the first lighting direction and the second lighting direction respectively, the driving part comprising a motor and a screw rod kinematically connected with the motor, the motor being fixed on the supporting frame, the screw rod engaging with the threaded hole, the motor driving the screw rod to rotate to make the movable frame slide along the at least one guiding post, wherein the driving part moves the movable frame such that the first light source and the second light source move simultaneously so as to selectively make the first light source or the second light source emit light along the lighting axis.

16. A projector, comprising:

a light device, having a lighting axis and comprising:
 a supporting frame;
 at least one guiding post, fixed on the supporting frame;
 a movable frame, slidably connected to the at least one guiding post, the movable frame having a threaded hole;
 a first light source, fixed on the movable frame, the first light source being capable of emitting light in a first lighting direction;
 a second light source, fixed on the movable frame, the second light source being capable of emitting light in a second lighting direction; and
 a driving part, kinematically connected with the movable frame, the driving part being in front of the first light source and the second light source in the first lighting direction and the second lighting direction respectively, the driving part comprising a motor and a screw rod kinematically connected with the motor, the motor being fixed on the supporting frame, the screw rod engaging with the threaded hole, the motor driving the screw rod to rotate to make the movable frame slide along the at least one guiding post, wherein the driving part moves the movable frame such that the first light source and the second light source move simultaneously so as to selectively make the first light source or the second light source emit light along the lighting axis;

a projection lens; and an optical engine, disposed close to the light device, the optical engine having a light entrance axis, the light entrance axis coinciding with the lighting axis, the optical engine comprising a digital micromirror device, the digital micromirror device modulating the light from the light device to be projected out the projector through the projection lens.

* * * * *